(No Model.)

F. M. MAY.
LEMON SQUEEZER.

No. 321,044. Patented June 30, 1885.

Witnesses:

Inventor:
Fred Mason May,
by Dodge & Son,
Attys.

UNITED STATES PATENT OFFICE.

FRED MASON MAY, OF MINNEAPOLIS, MINNESOTA.

LEMON-SQUEEZER.

SPECIFICATION forming part of Letters Patent No. 321,044, dated June 30, 1885.

Application filed October 11, 1884. (No model.)

*To all whom it may concern:*

Be it known that I, FRED MASON MAY, of Minneapolis, in the county of Hennepin and State of Minnesota, have invented certain new and useful Improvements in Lemon-Squeezers, of which the following is a specification.

My invention relates to a device for holding and squeezing pieces of lemon; and it is designed for individual use at hotel, restaurant, and private tables where pieces of lemon are served with oysters, sardines, and the like.

Figure 1:
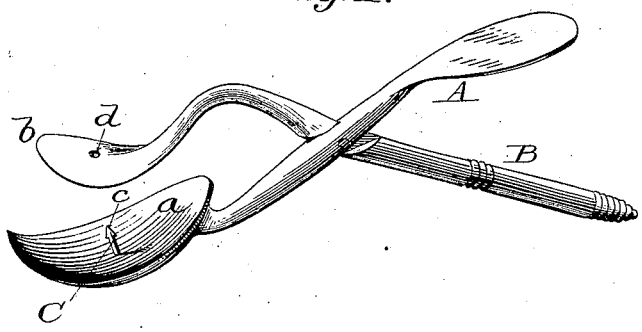
Figure 2:
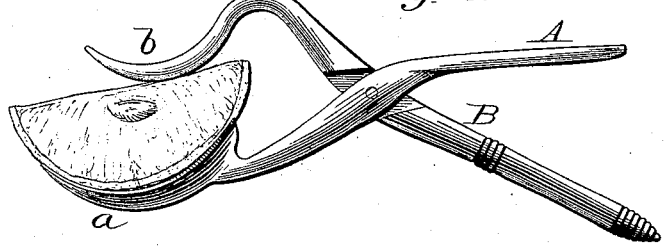

In the drawings annexed, Figure 1 is a perspective view of my improved device; Fig. 2, a similar view, showing a piece of lemon held in the implement ready for use.

As is well known, it is customary to serve with raw oysters and various articles of food slices or sections of lemon, the juice of which is squeezed upon such food. Hitherto it has been necessary to squeeze the lemon between the thumb and fingers, no convenient or suitable implement having hitherto been devised for the purpose. The common plan is objectionable, for the reasons that it soils the fingers, causes a consequent staining of napkins, and fails to fully express the juice of the lemon.

My device is designed to form an ornamental table implement, and to be furnished one to each person having need of its use.

Referring to the drawings, the implement will be seen to consist of two cross handles or levers, A and B, pivoted together at the point of crossing, suitably fashioned at one end to enable them to be grasped conveniently in one hand, and at the other end to be so formed as to adapt them one to hold and the other to press a piece of lemon, as indicated in Fig. 2.

The form of the forward or operative end of the lever is best shown in Fig. 1, where it will be seen that handle or lever A is formed with an elliptical concave or bowl, $a$, and the handle or lever B is fashioned into a convex presser-plate, $b$, conforming more or less closely to the shape of the bowl $a$ of lever A. From the center of the bowl $a$ projects a pin or stud, C, having a pointed and barbed end, $c$, which is designed to pierce the skin or peel of the lemon and hold the piece of lemon in place, so that there may be no liability of its dropping from the implement while the latter is in use.

The presser-plate $b$ is provided with a hole, $d$, through which the pin or stud C passes when the bowl and plate $b$ are pressed closely together.

It is particularly to be noted that the stud or pin C is adapted to pass entirely through the piece of lemon, and thus to hold it securely in place when the device is not held in the hand—in other words, to so hold the same that it need not be touched by the fingers of the person using the device. In this respect it differs from a mere teat or spur, which simply embeds itself in the peel of the lemon sufficiently to prevent slipping, but not to hold it in place when the jaws are opened or separated.

The pin, as provided in this device, is rendered especially necessary by reason of the form of the jaws, which do not offer a deep seat for the lemon, such as is found in the ordinary forms of lemon-squeezers. This peculiar form of the jaws not only requires less metal, but beautifies the device and conforms to the shape of the pieces for which the device is designed.

In preparing the implement for use, a piece of lemon of segmental shape is placed within the elliptical bowl $a$ and pressed down upon the pin or stud C, which effectually prevents its accidental displacement. In this condition the implement is placed upon the table, and when its use is desired the handles A B are grasped and pressed together in the same manner as the handles of a pair of pinchers, the juice of the lemon being pressed out between the elliptical bowl $a$ and presser-plate $b$.

The particular form of design or ornamentation of the implement, as a whole, may be varied, as desired, to suit the dictates of the user; but in any event the bowl $a$ and presser $b$ should be elliptical in form, to adapt them to the shape of the piece of lemon to be squeezed.

Having thus described my invention, what I claim is—

1. The new article of manufacture herein described, consisting of levers A and B, crossing each other, pivoted at the point of crossing, and provided, respectively, with elliptical concave bowl $a$ and elliptical convex presser $b$, arranged to hold and press pieces of lemon, as set forth.

2. The herein-described implement for holding and squeezing pieces of lemon, consisting of levers A and B, crossing each other and pivoted together, the lever A being provided with bowl $a$, having stud or pin C, and lever B, having presser-plate $b$, provided with hole $d$, as and for the purpose explained.

FRED MASON MAY.

Witnesses:
F. HOOKER,
W. M. BRENNER.